June 2, 1959     R. E. DENNEY     2,888,796
POWER LAWN MOWER
Filed May 21, 1956

INVENTOR.
Ralph E. Denney
BY
Murray, Sackhoff & Murray
ATT'YS

United States Patent Office 2,888,796
Patented June 2, 1959

2,888,796

POWER LAWN MOWER

Ralph E. Denney, Cincinnati, Ohio, assignor of one-half to Philip Ganson, Cincinnati, Ohio Application May 21, 1956, Serial No. 586,043

7 Claims. (Cl. 56—25.4)

The present invention relates to improvements in power lawn mowers and is particularly directed to the novel construction and placement of an auxiliary member within the downturned housing of a mower and which is rotated by the drive shaft of the mower cutter blade to secure a particular circulation of cut vegetation within the mower housing that provides a self-cleaning action which maintains the housing free of vegetation.

An object of this invention is to provide an extremely simplified yet effective self-cleaning device for cut vegetation which insures vegetation free, interior surfaces for the power mower housing, and provides even distribution of the clippings upon the ground regardless of the moisture content of the vegetation or its relative condition of dampness.

Another object of the invention is to provide for optimum air circulating conditions within the downwardly opening cutting chamber or hood of a rotary power mower to effect a self-cleaning action therein that precludes piling up of cut vegetation within the said hood that reduces the efficiency of the present day mowers, causes discharge of their clippings on the ground in unsightly clumps and requires frequent manual cleaning operations to be made on the mower hoods.

The foregoing and other features of my invention will be better understood from the following detailed description and the accompanying drawings of which:

Figure 1:
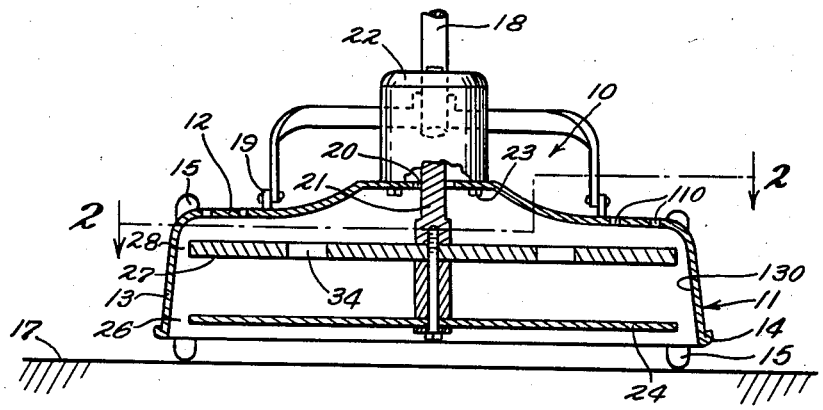
Fig. 1 is a view partly in end elevation and partly in vertical section through a power lawn mower embodying my invention.
Figure 3:
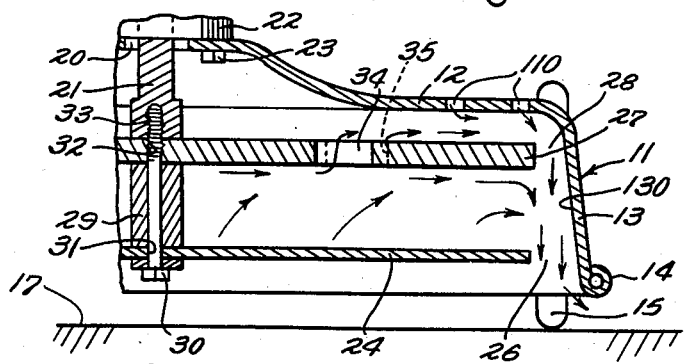
Fig. 3 is an enlarged section taken on line 3—3 of Fig. 2.

The lawn mower illustrated in the drawings is for exemplification only as my invention may be utilized with minor changes on practically any type of power lawn mower having a horizontal, rotary cutter blade mounted within a mobile, downwardly opening housing. A power mover having the aforementioned characteristics is indicated generally in the drawing by the reference numeral 10, said mower having a downwardly opening housing 11 comprising a circular top wall 12 and a continuous skirt 13 depending from the periphery of the top and terminating in a circular, rolled edge 14 at its lower end. A set of wheels 15 are secured by brackets 16 to the exterior face of the skirt in order that the housing may be supported in a mobile and a substantially horizontal condition with respect to the vegetation and grass growing on the ground 17 (Figs. 1 and 3). A conventional propelling handle 18 is secured to the housing 11 by suitable brackets 19, or the like.

The central part of the housing top 12 is provided with an aperture 20 for receiving a vertical drive shaft 21 connected to a source of power that is shown in the drawings as an electric motor 22 positioned upon the top 12, over the aperture 20 therein, and secured thereto by bolts 23 which may pass through the marginal edge portion of the top around the aperture and be threaded in the housing of the motor 22.

Figure 2:
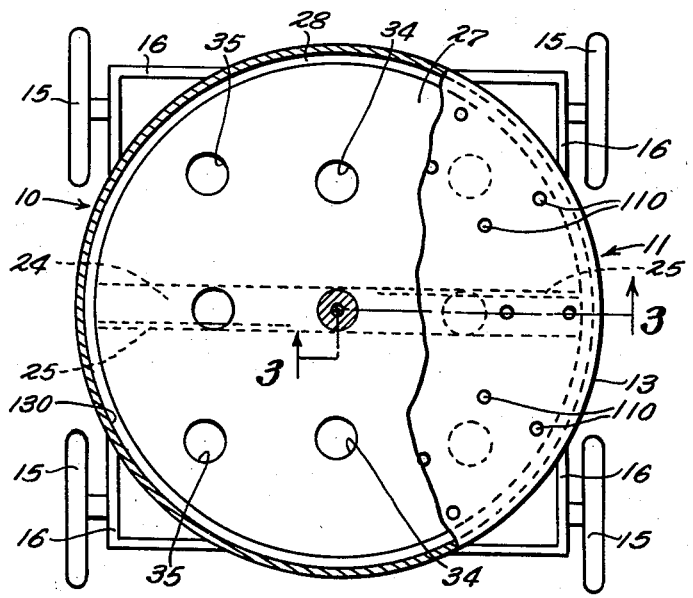
Fig. 2 is a section taken on line 2—2 of Fig. 1.

As most clearly shown in Figs. 1 and 2 the axis of rotation of the drive shaft 21 coincides with the axial center line of the circular housing 11, the lower end of said drive shaft having mounted thereon at its center portion a cutter blade 24 that is adapted to rotate in a horizontal plane within the lower portion of the housing. The cutter 24 is the usual bar type and has sharpened leading edges 25 for cutting vegetation. It will be noted that the length of the cutter blade is somewhat shorter than the diagonal dimension of the housing 11 so that an annular unobstructed way 26 is formed between the outer ends of the rotating blade 24 and the interior wall 130 of the skirt 13.

Within the upper part of the housing 11 there is located the auxiliary rotary member of this invention which takes the form of a perforate air disc 27 that is mounted concentrically on the shaft 21 for rotary movement thereby in a horizontal plane; the said disc being formed on a diameter slightly less than the inside diameter of the housing so as to provide an annular passageway 28 between the periphery of the disc and the inside face of the skirt 13. As best shown in Fig. 3 the blade and the disc may be fixed to the shaft for rotatory movement therewith by the simple expedient of interposing a spacer sleeve 29 between them and passing a long bolt 30 through a center hole 31 in the blade, through the sleeve, through a center hole 32 formed in the disc 26 and threading its upper end in a threaded counterbore 33 made concentrically in the bottom of the shaft 21.

The auxiliary air disc 27 is preferably made of hard pressed and bonded fibrous material that is relatively thick to provide the disc with enough body to give it a flywheel action when it and the blade are rotated by the power means. The disc is made perforate by means of a number of holes formed through the disc normal to its major faces. Each hole has a corresponding hole of the same diameter positioned diametrically opposite to it and equispaced from the center of the disc, it being though that two circular rows of such holes 34 and 35 on different radii, 90° apart in the row, and angularly spaced apart 45° between rows will provide sufficient air movement across the top and bottom faces of the disc to secure the desired cleaning action.

A pilot means for regulating the amount of air that is to be admitted through the perforate disc from the underside to its top surface takes the form of an annular row or rows of holes 110 formed through the top wall within the peripheral extent of the disc and above the annular passageway 28 formed between the periphery of the disc and the inside upper portion of the skirt.

In the operation of the power lawn mower embodying my invention the motor 22 is started and thereafter the mower is pulled or pushed over the area that is to be cut. Actuation of the motor causes the cutter blade 24 and the auxiliary disc 26 to be rotated in unison within the lower and upper portions, respectively, of the downwardly opening housing 11, rotation of said disc setting up a circulating air mass therein that is indicated by the arrows in Fig. 3. With particular reference to said Fig. 3 it will be seen that the whirling action of the top and bottom surfaces of the perforate air disc 27 will set up an outward flow of air from the center on each major side of the disc, a certain amount of the air near the center portion of the disc's underside passing upwardly through the rows of holes 34 and 35. The quantity of such air passing upwardly through holes 34 is dependent on the number and sizes of the pilot holes 110 in the housing which admit outside air into the upper portion of the housing by a venturi action. All the air drawn through the pilot holes 110 and the holes 34 and 35 by the top side of the rotating disc is impelled from the top downwardly through the passageway 28 and thence down the inside face of the skirt 13. The row of holes 34 therefore causes an updraft of air at the center of the housing which may to some extent be aided by the action of the cutter blade 24 which may impel the air upwardly and outwardly against the underside of the rotating disc. The air propelled by the underside of the disc joins the downdraft of air from the annular passageway 28 and both move downwardly against the inside face 130 of the skirt 13, through the annular way 26 between the rotating blade and the skirt and hence to the ground. When the tops of grass and other vegetation are severed by the cutter blade 24 such clippings tend to follow the paths of circulating air heretofore described with the exception that the clippings that come in contact with the underside of the rotating disc will be hurled outwardly toward the skirt and only a few will pass upwardly through the holes 34 or 35 in the rotating disc. The few small clippings that do enter the upper part of the housing through the holes in the rotating disc are thrown by the outward air flow on the upper side of the disc toward the skirt and are carried downwardly through the annular passageway 28 to the ground. Also the weight of the clippings will cause them to fall after striking the disc which when aided by the downdraft around the inside face of the skirt will cause the clippings to move toward the ground through the way 26 between the cutter blade 24 and the interior face 130 of the skirt and be deposited on the ground. Thus a self-cleaning action is provided within the downwardly opening housing by the rotating, perforate disc that positively maintains the interior surfaces of the housing free of clippings and also secures continuous ejection of such clippings from the housing for even distribution upon the ground.

What is claimed is:

1. In a power mower the combination of a downwardly opening, mobile housing having a circular top and an upstanding, continuous skirt depending from the periphery of said top, a source of power mounted on the housing, a vertical drive shaft operatively connected to the source of power and depending into the housing at the center thereof, a cutter blade fixed to the end of the shaft and rotated thereby in a horizontal plane within the lower portion of the housing, and a perforate air disc secured to an intermediate portion of the shaft for rotation therewith in a horizontal plane within the upper portion of the housing, said disc having a diameter slightly smaller than the inside diameter of the housing to provide a narrow, annular passageway between the periphery of the disc and the inside face of the skirt.

2. The organization according to claim 1 wherein the perforate disc has at least two concentric rows of spaced apart holes extending vertically therethrough, the rows being disposed on different radii of the disc.

3. In a power mower the combination of a downwardly opening, mobile housing having a circular top and an upstanding, continuous skirt depending from the periphery of said top, a source of power mounted on the housing, a vertical drive shaft operatively connected to the source of power and depending into the housing at the center thereof, a cutter blade fixed to the end of the shaft and rotated thereby in a horizontal plane within the lower portion of the housing, a perforate air disc secured to an intermediate portion of the shaft for rotation therewith in a horizontal plane within the upper portion of the housing, said disc having a diameter slightly smaller than the inside diameter of the housing to provide a narrow, annular passageway between the periphery of the disc and the inside face of the skirt, and an air pilot means located in the top of the housing.

4. The organization according to claim 3 wherein the air pilot means is an annular row of vent holes extending through the housing top concentrically and within the periphery of the disc and located above the annular passageway between the disc and the skirt.

5. In a power mower the combination of a housing having a top and a depending skirt joined thereto, a source of power for the mower, a vertical drive shaft operatively connected to the source of power and depending into the housing, a cutter blade fixed to the lower end of the shaft and rotated thereby in a horizontal plane within the housing, and a perforate air disc secured to an intermediate portion of the shaft for rotation therewith in a horizontal plane within the housing and spaced from and above the cutter blade.

6. In a power mower the combination of a downwardly opening housing, a vertical, power driven rotary shaft depending into the housing, a cutter blade fixed to the lower end of the shaft, and a perforate air disc fixed to the shaft above and in parallel spaced relation to the said cutter blade.

7. In a power mower the combination of a downwardly opening housing, a vertical, power driven rotary shaft depending into the housing, a cutter blade fixed to the lower end of the shaft, a perforate air disc fixed to the shaft above and in parallel spaced relation to the said cutter blade, and an air pilot means in the housing above the level of the perforate air disc and within the peripheral extent of the said disc.

References Cited in the file of this patent

UNITED STATES PATENTS

| | | |
|---|---|---|
| 2,415,372 | Salt et al. | Feb. 4, 1947 |
| 2,557,598 | Daggett | June 19, 1951 |
| 2,641,100 | Sylvester | June 9, 1953 |
| 2,663,984 | Clark | Dec. 29, 1953 |
| 2,669,827 | Brownlee | Feb. 23, 1954 |
| 2,737,003 | Beers | Mar. 6, 1956 |